(12) United States Patent
Markham (10) Patent No.: US 10,728,249 B2
(45) Date of Patent: *Jul. 28, 2020

(54) APPROACH FOR SECURING A VEHICLE ACCESS PORT

(71) Applicant: GARRETT TRANSPORTATION I INC., Torrance, CA (US)

(72) Inventor: Thomas R. Markham, Fridley, MN (US)

(73) Assignee: GARRETT TRANSPORATION I INC., Torrance, CA (US)

( * ) Notice: Subject to any disclaimer, the term of this patent is extended or adjusted under 35 U.S.C. 154(b) by 483 days.

This patent is subject to a terminal disclaimer.

(21) Appl. No.: 15/469,156

(22) Filed: Mar. 24, 2017

(65) Prior Publication Data

US 2017/0310674 A1    Oct. 26, 2017

Related U.S. Application Data

(63) Continuation-in-part of application No. 15/138,987, filed on Apr. 26, 2016, now Pat. No. 10,124,750.
(Continued)

(51) Int. Cl.
*H04L 29/06* (2006.01)
*H04L 9/32* (2006.01)
(Continued)

(52) U.S. Cl.
CPC .......... *H04L 63/10* (2013.01); *B60R 16/0231* (2013.01); *H04L 9/0825* (2013.01);
(Continued)

(58) Field of Classification Search
CPC ..... H04L 63/10; H04L 63/083; H04L 9/3263; H04L 9/0825; H04L 9/3247;
(Continued)

(56) References Cited

U.S. PATENT DOCUMENTS

| 5,917,405 A | 6/1999 | Joao |
| 6,314,351 B1 | 11/2001 | Chutorash |

(Continued)

FOREIGN PATENT DOCUMENTS

| GB | 2430585 A | * 3/2007 | ......... H04L 63/0227 |
| GB | 2430585 A | 3/2007 | |

(Continued)

OTHER PUBLICATIONS http://www.blackpoolcommunications.com/products/alarm-immo . . . , "OBD Security OBD Port Protection—Alarms & Immobilizers . . . ," 1 page, printed Jun. 5, 2017.
(Continued)

*Primary Examiner* — Trang T Doan
(74) *Attorney, Agent, or Firm* — Seager, Tufte & Wickhem, LLP (57) ABSTRACT

The disclosure reveals a system having secured electronic access. The system may have one or more vehicle buses, one or more electronic control units on a vehicle connected to the one or more vehicle buses, a security module connected to the one or more vehicle buses, and a vehicle access port connected to the security module. An accessing entity may attempt connection to the vehicle access port. Messages injected or extracted by the accessing entity may be authorized or unauthorized at the security module based on a security policy.

4 Claims, 5 Drawing Sheets

Related U.S. Application Data (60) Provisional application No. 62/406,908, filed on Oct. 11, 2016.

(51) Int. Cl.

| | | |
|---|---|---|
| *H04L 29/08* | (2006.01) | |
| *H04L 9/08* | (2006.01) | |
| *B60R 16/023* | (2006.01) | |
| *H04W 12/04* | (2009.01) | |
| *H04W 12/06* | (2009.01) | |

(52) U.S. Cl.
CPC .......... *H04L 9/3247* (2013.01); *H04L 9/3263* (2013.01); *H04L 9/3268* (2013.01); *H04L 63/02* (2013.01); *H04L 63/0435* (2013.01); *H04L 63/0442* (2013.01); *H04L 63/061* (2013.01); *H04L 63/083* (2013.01); *H04L 63/20* (2013.01); *H04L 67/12* (2013.01); *H04W 12/04* (2013.01); *H04W 12/06* (2013.01); *H04L 2209/80* (2013.01); *H04L 2209/84* (2013.01)

(58) Field of Classification Search
CPC ... H04L 9/3268; H04L 63/20; H04L 63/0435; H04L 63/0442; H04L 63/061; H04L 67/12; H04L 63/02; H04L 2209/80; H04L 2209/84; H04W 12/04; H04W 12/06; B60R 16/0231
USPC .......................................................... 726/27
See application file for complete search history.

(56) References Cited

U.S. PATENT DOCUMENTS

| | | | |
|---|---|---|---|
| 6,314,662 B1 | 11/2001 | Ellis, III | |
| 6,542,076 B1 | 4/2003 | Joao | |
| 6,549,130 B1 | 4/2003 | Joao | |
| 6,990,401 B2 | 1/2006 | Neiss et al. | |
| 7,277,010 B2 | 10/2007 | Joao | |
| 7,397,363 B2 | 7/2008 | Joao | |
| 7,712,139 B2 | 5/2010 | Westendort et al. | |
| 7,721,030 B2 | 5/2010 | Fuehrer et al. | |
| 7,748,217 B2 | 7/2010 | Muller | |
| 7,808,371 B2 | 10/2010 | Blanchet et al. | |
| 7,925,399 B2 | 4/2011 | Comeau et al. | |
| 8,316,235 B2 | 11/2012 | Boehl et al. | |
| 8,370,052 B2 | 2/2013 | Lin et al. | |
| 8,402,268 B2 | 3/2013 | Dierickx | |
| 8,639,925 B2 | 1/2014 | Schuetze | |
| 8,667,288 B2 | 3/2014 | Yavuz | |
| 8,768,996 B2 | 7/2014 | Shokrollahi et al. | |
| 8,867,746 B2 | 10/2014 | Ceskutti et al. | |
| 8,983,069 B2 | 3/2015 | Merchan et al. | |
| 9,100,193 B2 | 8/2015 | Newsome et al. | |
| 9,141,996 B2 | 9/2015 | Christensen et al. | |
| 9,175,595 B2 | 11/2015 | Ceynow et al. | |
| 9,325,494 B2 | 4/2016 | Boehl | |
| 9,367,701 B2 | 6/2016 | Merchan et al. | |
| 9,367,968 B2 | 6/2016 | Giraud et al. | |
| 9,483,881 B2 | 11/2016 | Comeau et al. | |
| 9,560,071 B2 | 1/2017 | Ruvio et al. | |
| 9,779,742 B2 | 10/2017 | Newsome, Jr. | |
| 2002/0112469 A1 | 8/2002 | Kanazawa et al. | |
| 2004/0185842 A1* | 9/2004 | Spaur ................... H04W 12/06 455/420 |
| 2006/0137347 A1 | 6/2006 | Stewart et al. | |
| 2006/0185626 A1 | 8/2006 | Allen et al. | |
| 2006/0212140 A1 | 9/2006 | Brackney | |
| 2007/0240213 A1 | 10/2007 | Karam et al. | |
| 2007/0261648 A1 | 11/2007 | Reckels et al. | |
| 2008/0010973 A1 | 1/2008 | Gimbres | |
| 2008/0289605 A1 | 11/2008 | Ito | |
| 2009/0172416 A1 | 7/2009 | Bosch et al. | |
| 2011/0112969 A1* | 5/2011 | Zaid ...................... G06Q 10/02 705/50 |
| 2011/0173315 A1 | 7/2011 | Aguren | |
| 2012/0174187 A1 | 7/2012 | Argon et al. | |
| 2013/0024069 A1 | 1/2013 | Wang et al. | |
| 2013/0131954 A1 | 5/2013 | Yu et al. | |
| 2013/0158834 A1 | 6/2013 | Wagner et al. | |
| 2013/0242706 A1 | 9/2013 | Newsome, Jr. | |
| 2013/0326232 A1 | 12/2013 | Lewis et al. | |
| 2013/0326630 A1 | 12/2013 | Argon | |
| 2014/0171856 A1 | 6/2014 | McLaughlin et al. | |
| 2014/0258736 A1 | 9/2014 | Merchan et al. | |
| 2014/0270163 A1 | 9/2014 | Merchan | |
| 2014/0316683 A1 | 10/2014 | Whitney et al. | |
| 2015/0100197 A1* | 4/2015 | Peirce .................. H04W 12/08 701/31.5 |
| 2015/0142533 A1* | 5/2015 | Shalev .................. G06Q 50/30 705/13 |
| 2015/0275783 A1 | 10/2015 | Wong et al. | |
| 2015/0321642 A1 | 11/2015 | Schwepp et al. | |
| 2015/0324576 A1 | 11/2015 | Quirant et al. | |
| 2015/0334093 A1 | 11/2015 | Mueller | |
| 2016/0003180 A1 | 1/2016 | McNulty et al. | |
| 2016/0043832 A1 | 2/2016 | Ahn et al. | |
| 2016/0108732 A1 | 4/2016 | Huang et al. | |
| 2016/0127357 A1 | 5/2016 | Zibushka et al. | |
| 2016/0216699 A1 | 7/2016 | Pekar et al. | |
| 2016/0239593 A1 | 8/2016 | Pekar et al. | |
| 2016/0259584 A1 | 9/2016 | Schlottmann et al. | |
| 2016/0294605 A1* | 10/2016 | Searle ................... H04L 41/082 |
| 2016/0306966 A1* | 10/2016 | Srivastava ............. G06F 21/31 |
| 2016/0330204 A1 | 11/2016 | Baur et al. | |
| 2016/0344705 A1 | 11/2016 | Stumpf et al. | |
| 2016/0362838 A1 | 12/2016 | Badwe et al. | |
| 2016/0365977 A1 | 12/2016 | Boutros et al. | |
| 2017/0031332 A1 | 2/2017 | Santin | |
| 2017/0048063 A1 | 2/2017 | Mueller | |
| 2017/0126701 A1 | 5/2017 | Glas et al. | |
| 2017/0218860 A1 | 8/2017 | Pachner et al. | |
| 2017/0300713 A1 | 10/2017 | Fan et al. | |
| 2017/0306871 A1 | 10/2017 | Fuxman et al. | |

FOREIGN PATENT DOCUMENTS

| | | | |
|---|---|---|---|
| WO | 0169056 | A1 | 9/2001 |
| WO | 03102394 | A1 | 12/2003 |
| WO | 2013144962 | A1 | 10/2013 |
| WO | 2014129107 | A1 | 8/2014 |

OTHER PUBLICATIONS

ISO, "ISO Document No. 13185-22015(E)," 3 pages, 2015.

http://www.cnbc.com/2016/09/20/chinese-company-hacks-tesla-car-remotely.html, "Chinese Company Hacks Tesla Car Remotely," 3 pages, Sep. 20, 2016.

The Extended European Search Report for EP Application No. 17151521.6, dated Oct. 23, 2017.

The Extended European Search Report for EP Application No. 17163452.0, dated Sep. 26, 2017.

Greenberg, "Hackers Cut a Corvette's Brakes Via a Common Car Gadget," downloaded from https://www.wired.com2015/08/hackers-cut-corvettes-brakes-v . . . , 14 pages, Aug. 11, 2015, printed Dec. 11, 2017.

* cited by examiner

APPROACH FOR SECURING A VEHICLE ACCESS PORT

This application claims the benefit of U.S. Provisional Application Ser. No. 62/406,908, filed Oct. 11, 2016. U.S. Provisional Application Ser. No. 62/406,908, filed Oct. 11, 2016, is hereby incorporated by reference.

This application is a continuation-in-part of U.S. patent application Ser. No. 15/138,987, filed Apr. 26, 2016. U.S. patent application Ser. No. 15/138,987, filed Apr. 26, 2016, is hereby incorporated by reference.

BACKGROUND

The present disclosure pertains to electronic control units in vehicles.

SUMMARY

The disclosure reveals a system having secured electronic access. The system may have one or more vehicle buses, one or more electronic control units on a vehicle connected to the one or more vehicle buses, a security module connected to the one or more vehicle buses, and a vehicle access port connected to the security module. An accessing entity may attempt connection to the vehicle access port. Messages injected or extracted by the accessing entity may be authorized or unauthorized at the security module based on a security policy.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

A vehicle access port may be regarded as a way of extracting diagnostic information and supporting a right to repair. Self-driving vehicles and cellular dongles plugged into the vehicle access port were not necessarily anticipated when the access methods were introduced. Researchers appear to have shown that the cellular modem on a vehicle access dongle may be hacked, allowing the attacker to tamper with the vehicle brakes. Advanced driver assistance systems (ADAS), self-driving features and other vehicle functions may be vulnerable as well. The industry should balance the interests of multiple stakeholders including original equipment manufacturers (i.e., vehicle manufacturers) who are required to provide vehicle access functions, repair shops that have a legitimate need to access the OBD functions, dongle providers and drivers. Vehicle manufacturers may need the ability to protect drivers and manage liability by limiting how a device or software application may modify the operation of a vehicle. A technical approach based upon cryptographic authentication and granular access control policy which addresses the needs of stakeholders may be noted. This may allow the vehicle manufacturer to protect the security of the vehicle by carefully controlling the functions that a particular device plugged into the vehicle access port is able to perform. This may allow device makers (diagnostic tools, insurance dongles, and so forth) to have their products certified to work with the vehicle manufacturer's vehicles. The result may be that the vehicle manufacturers can protect driver safety and maintain the right to repair.

There appears to be a real growing threat to automotive cyber security and, in turn, safety. In particular, the vehicle access port has given rise to greater risks. The number of vehicles with brakes, steering and acceleration influenced by messages on a controller area network (vehicle bus) bus appears to be increasing due to self-parking, ADAS and a move toward autonomous driving. Vehicle access has transitioned from a physical port only accessible from inside the cabin of the vehicle to ports that are wirelessly accessible via cellular modems, Bluetooth, USB, DSRC and Wi-Fi dongles. There appears to be evidence that interest in cyber security of vehicles is migrating from white hat researchers to hackers with hostile intent. Taken together, these issues may call for taking a fresh look at the vehicle access port and identifying an up-to-date approach for protecting vehicle security and safety.

There appears to have been a growing list of researchers who have demonstrated that gaining access to the vehicle bus via the vehicle access port can allow a hacker to influence control of a vehicle. Those researchers who have used wireless access via an accessing entity to compromise a vehicle's security may be of particular interest.

Society of Automotive Engineers (SAE) standards may work in the form of SAE J2186-E/E Data Link security addressed access to electronic control units (ECUs) via a data or diagnostic link connector (DLC). ("OBD" may be used to designate a vehicle access and the DLC.) When SAE J2186 was revised in 2005, the threat environment and motivation to secure vehicles appeared to be very different from today.

Historically, the vehicle bus was an island, i.e., an air-gapped network contained within the sheet metal envelope of the vehicle. Everything on the network was integrated by a vehicle manufacturer and trusted to preserve the cyber security of the vehicle. Anyone attempting to send vehicle bus messages on the bus was assumed to be inside the vehicle and therefore trusted. This level of trust and openness on the vehicle bus appeared reasonable back in the day when brakes, steering and transmission were controlled by physical linkages, not a network. Today, a lack of source authentication on the vehicle bus appears to be a security and safety issue.

An original purpose of the data link connector and OBD appears to have been designed to allow repair shops to connect with engine controls to perform diagnostics and gather emissions related information. The vehicle access port appeared originally not necessarily as a way to remotely inject commands which could affect brakes, steering or acceleration of an auto. An insecure cellular modem connected to the vehicle access port may control vehicle operation.

SAE J2186 may be focused on protecting the integrity of a single ECU, i.e., SAE J2186 may be used to prevent a device from changing firmware or calibration parameters within a specific ECU unless the device at the vehicle access port can authenticate to the ECU as being a device authorized to make changes to that ECU. Not just preventing an OBD connected device from making changes to an ECU, one may also prevent an OBD connected device from injecting vehicle bus messages which trigger ECU actions, e.g., a message injected via the OBD may trigger an ECU to unlock the doors.

The vehicle bus does not necessarily perform source authentication of messages placed on the vehicle bus. Thus, an attacker who is able to inject messages into the vehicle access port may send messages which appear to come from one of the ECUs on the bus.

Figure 1:
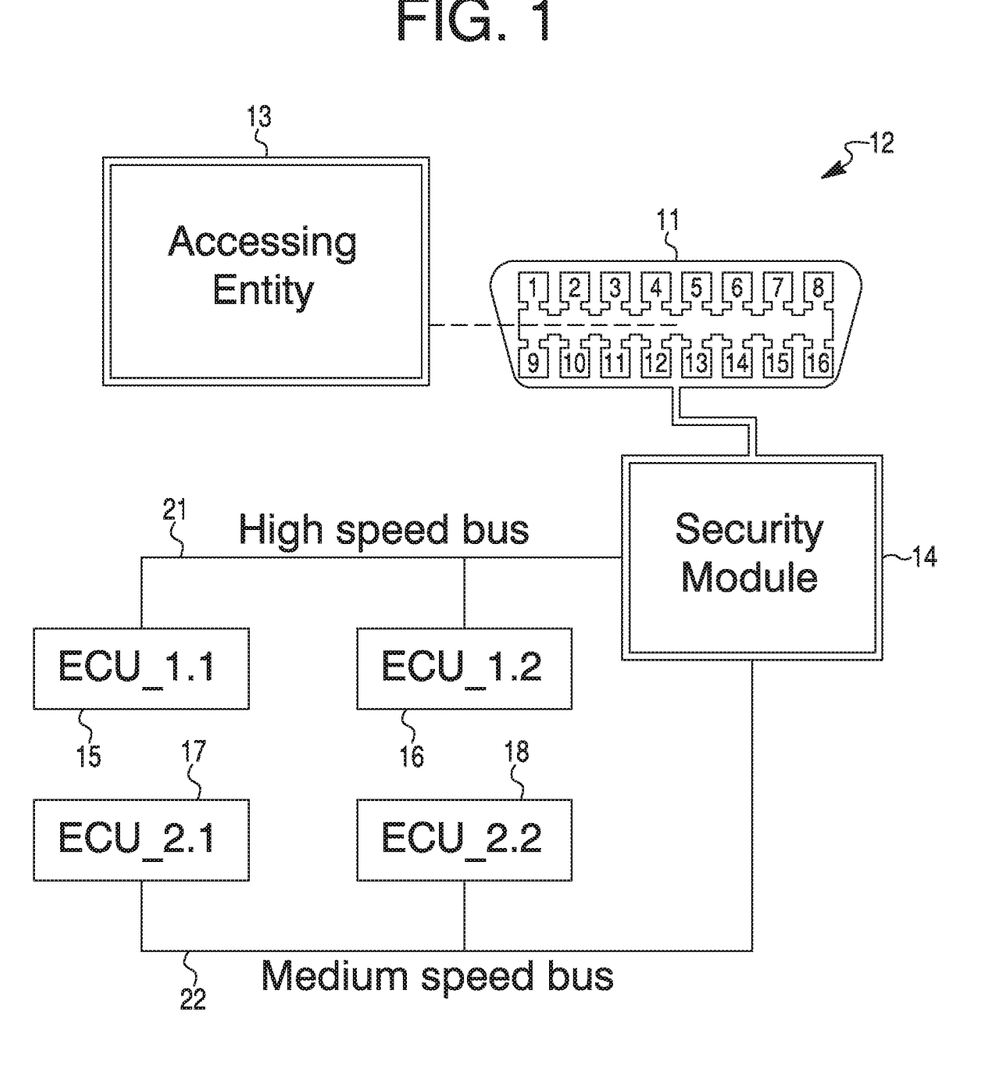
FIG. 1 is a diagram of an on-board computer arrangement of a vehicle with a security module.

FIG. 1 is a diagram of an example of a security module within the vehicle having an accessing entity. Referring to the Figure, if the security module is not present, then an accessing entity might be able to place messages on a vehicle bus 21 or 22 which would normally be sent to ECU_1.x or ECU_2.x (ECUs 15-18). Therefore, anything that these ECUs would normally do may be done by an attacker via a vehicle access port to a vehicle bus. A few of the many things that such an attacker could do via the vehicle access port and bus may include flashing the headlights, unlocking the doors, turning the air conditioning on/off, activating anti-lock brake functions, turning the front wheels (on a vehicle with automatic parking capability), changing the speed shown on the speedometer, and so forth.

Some of these actions may be categorized as nuisance aimed at distracting the driver. Other actions may directly affect vehicle operation thereby taking control away from the driver or interfering with driver actions. These actions may result in safety hazards.

A vehicle access port may be a source of data that can be used and manipulated for insurance tracking, monitoring vehicle performance, and other "diagnostic" functions. Low cost wireless accessing entities may be commercially available. These devices may provide access via cellular, Wi-Fi or Bluetooth devices. The security of these devices may be an issue. For instance, one may plug such device in a car's OBD2 port, turn on the car, enable Bluetooth on an Android phone or tablet, search for "OBDII" and pair with it (e.g., pin no.), run a download App with simple settings and wait until it connects the car's ECU successfully. A hacker may know the pairing code for all devices of a particular model. Other security flaws may lurk in these kinds of devices. Besides a OBDII port, vehicle access may be via Internet, vehicle-to-vehicle using dedicated short-range communications, cellular networks, Bluetooth, Wi-Fi, USB, and so on.

Vehicle buses may incorporate controller area networks (CANs), Ethernet, CAN-FD (flexible data rate), MOST, FlexRay, and so on.

A vehicle network may be one or more vehicle buses and ECUs and the like.

An accessing entity may incorporate cell phones, OBDs, diagnostic tools, another vehicle (e.g., vehicle-to-vehicle), infrastructure (e.g., vehicle-to-infrastructure), device, application, tool service, function, and so on, requesting access to the vehicle network.

An OBD port may be instead a vehicle access port of other types.

OEM may be that or some other vehicle manufacturer.

The security module may be that or a policy enforcement engine.

An accessing entity manufacturer may instead be referred to as or be an accessing entity provider.

Hacking appears to have made significant strides over the years. Hacking may remotely damage or destroy physical systems. Today, organized crime may hack for money. Ransomware attacks may occur on home PCs and at businesses. Ransomware attacks may occur against vehicles.

Requirements to secure a vehicle access port and associated components may be noted. A vehicle manufacturer may be required by law to provide a vehicle access port to support diagnostics. Independent repair shops and vehicle owners should have a right to repair which includes access to many vehicle functions via the OBD-II. Some "secured functions" may be unlocked per SAE J2186. However, many functions are not necessarily locked.

Third parties (e.g., insurance companies) may be provided read access to vehicle data such as a vehicle Identification Number (VIN), speed and braking via OBD.

Accessing entity providers may be enabled to have an ability to offer vehicle-related services via the vehicle access port. Industry should balance access with vehicle security and safety concerns.

A vehicle owner may be provided an ability to use mobile apps (e.g., torque, dash, OBD auto doctor, and so forth) to retrieve information from the vehicle.

Safety of modern automobiles may need the automobiles to have cyber security to protect them from malicious commands/data injected via the vehicle access port. Thus, a way may be provided to test and certify the vehicle bus messages injected by an OBD connected device (e.g., an insurance dongle, diagnostic tool, and so on). A way may be provided to authenticate a device plugged into a vehicle access port, i.e., to determine a manufacturer of the device and the model number.

Vehicle manufacturer approved access rights for an authenticated device relative to the vehicle access port may be determined and enforced. For instance, a device may read all of the data but can only write to the body control modules that control a non-critical function such as air conditioning.

Defensive technologies may be employed to enhance security. Public key cryptography and access control mechanisms may be combined to provide an authenticated access control function for a vehicle access port.

Elements may incorporate public key (asymmetric) cryptography such as RSA and elliptic curve cryptography, public key constructs such as digital signatures, x.509 certificates and public key infrastructure (e.g., certification authorities), and key management protocol in that public key technology may be used to perform key agreement (A.K.A., key exchange). There may be many variations of this including those used within transport layer security (TLS) and the internet security association key management protocol (ISAKMP). Another element may incorporate access control list. There may be access control lists and packet filters used within firewalls. An ability to change the packet filter policy within an automobile may be based upon the identity of the accessing entity. Certificates may be of various kinds besides the X.509 certificates, such as those of IEEE 1609.2, proprietary formats, and so on.

The present approach may incorporate a vehicle manufacturer approving a manufacturer/provider and its device/service/application such that the device/service/application is assigned a unique security policy.

An approach of distributing new security policy for a specific device/service/application may be noted. This approach may allow a device/service/application to bring its unique security policy with it to a vehicle.

There may be a configurable policy enforcement engine or security module within a vehicle environment. An approach of constructing the default security policy may allow legacy devices/services/applications to safely interoperate with the vehicle while allowing new certified devices/services/applications greater privilege.

The present approach may embed the policy enforcement engine within the vehicle architecture such that it may be independent of the access media. Thus, the devices/services/applications may access the vehicle via cellular, Wi-Fi, Bluetooth, vehicle-to-infrastructure, vehicle-to-vehicle or USB, and still interoperate with the configurable policy enforcement engine.

The vehicle environment including motorcycles, automobiles, light trucks, heavy trucks and military vehicles may be experiencing a change in the threat model as the world moves to connected vehicles and the Internet of Things (IoT). These vehicles may frequently contain networks within them which perform control of safety and/or security critical functions. However, many of the networks (e.g., Controller Area Network (CAN)) and controllers (Electronic Control Unit (ECU)) may lack sufficient security. As a result, some of these vehicles may be subject to being hacked. The number of devices and/or applications connecting to vehicles may rise as IoT and cloud usage increases.

The present approach may provide an access control mechanism which enforces a vehicle manufacturer specified security policy for the device or application connecting to the vehicle.

The present approach may be applied to any media used to connect to a vehicle network via a telematics control unit (TCU), another wireless interface, or even a USB. A communications model diagram in FIG. 2, may illustrate a location of the configurable policy enforcement engine (security module) 71 which allows a policy to be applied to any communications channel (medium) 72 used to access a vehicle, between assessing entity 73 at port 75 and security module 71 at port 76. Example channels may include Internet, cellular, Bluetooth, WiFi, USB, V2V-DSRC, V2I-DSRC, and so on.

Figure 2:
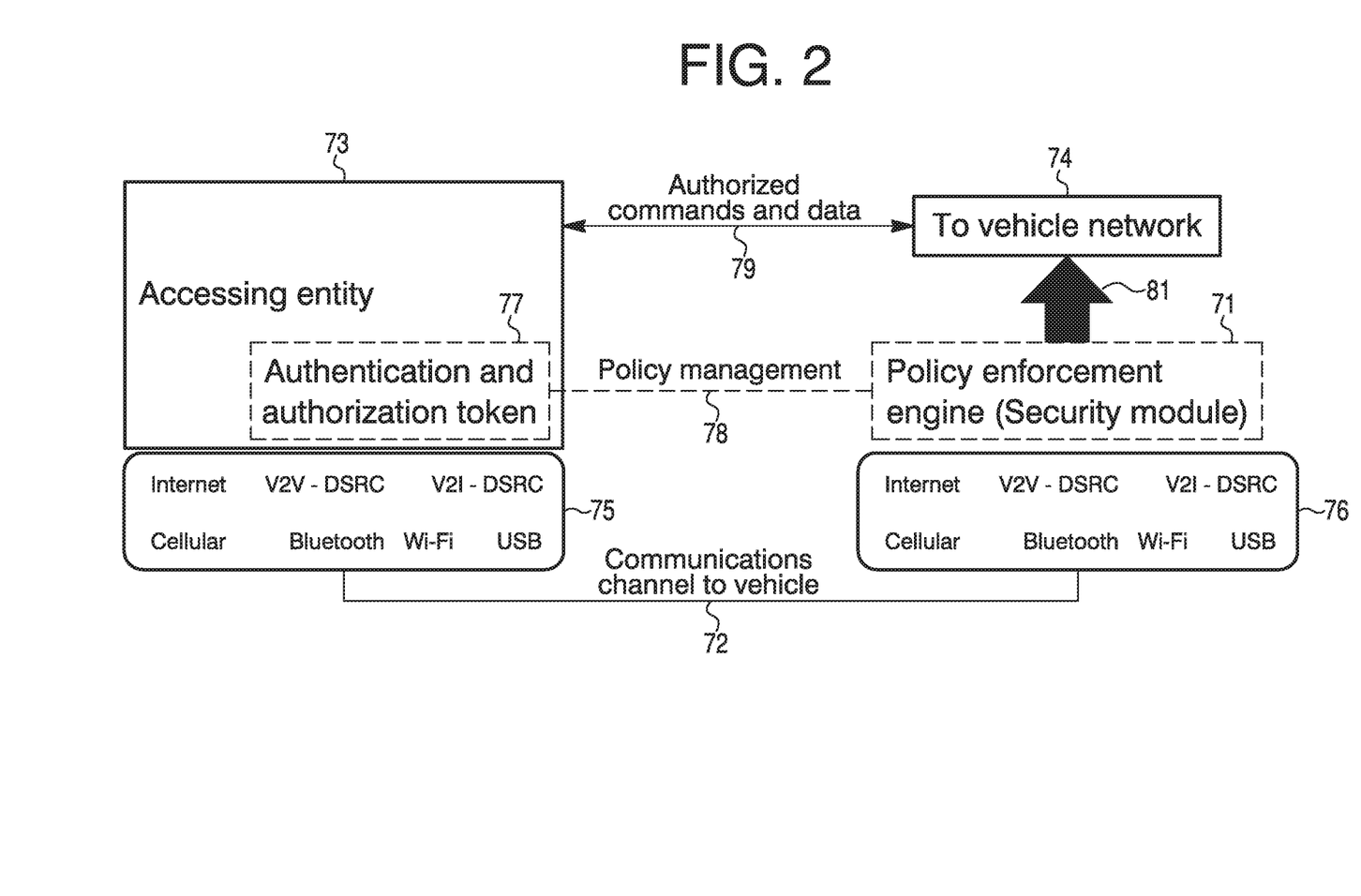
FIG. 2 is a diagram that illustrates a location of the configurable policy enforcement engine or security module which allows a policy to be applied to a communications channel used to access a vehicle, between assessing entity and policy enforcement engine or security module.

The present approach may use a term "accessing entity" 73 to denote the device, application, tool service or function requesting access to a vehicle network 74. Authorized commands and data may flow between accessing entity 73 and vehicle network 74 along connection 79. The approach may allow a vehicle manufacturer to certify devices, applications and functions that communicate with the vehicle. The certification may result in a token and associated public key technology which is used to authenticate at symbol 77, via a connection 78, accessing entity 73, and determine the access rights (authorization policy) to be enforced relative to accessing entity 73. Security module (policy enforcement engine) 71 may connected to vehicle network 74 via a port 81.

The token carrying the policy may be assigned by the vehicle manufacturer. Other approaches may use a fixed policy or require the vehicle to connect back to the vehicle manufacturers via the Internet to complete an authentication and/or policy specification process. The result may be that vehicle manufacturers can authorize a trusted accessing entity to perform operations which may have safety or security consequence, such as starting the engine, unlocking doors, and so forth.

The present approach may free the vehicle manufacturer from a one size fits all security policy in the vehicle, that is, every accessing entity gets the same access rights. The approach may enable third parties to create accessing entities which can have authorization to perform actions on the vehicle which are not practical using a one-size-fits-all policy. The approach may eliminate the risk associated with having vehicle owners set access control policy for the complex systems within a vehicle. Many vehicle owners may not understand the technologies and risks well enough to make safe choices for themselves and others on the road. The present approach may allow vehicle manufacturers to enforce new security policies in their vehicles as new accessing entities come to market, even if their vehicles were produced before the accessing entity was conceived. For example, if a new "secure" phone is introduced after a vehicle is produced, the vehicle manufacturer may certify the new secure phone to interoperate with vehicles already on the road.

The present approach may be based upon the application of public key technology in the context of accessing the vehicle network. Public key (a.k.a., asymmetric key) cryptography technology in a form of Rivest, Shamir and Adleman (RSA) and an elliptic curve may make it possible to provide digital signatures and create a public key infrastructure tailored to the needs of protecting vehicles. Public key cryptography may use two keys which are mathematically-related. The private key should to be protected from unauthorized access. The private key may be stored in some form of protected hardware and only accessed by a cryptographic engine within the hardware. Thus, the private key may be used by the cryptographic engine to sign and encrypt/decrypt data but the key cannot necessarily be extracted from the cryptographic engine. The corresponding public key may be freely distributed. The public key does not necessarily require any confidentiality protection. The two cryptographic functions may be used herein.

A digital signature is an operation in which the creator digitally may sign a piece of data by using a private key. The signature may be a string of bits which, practically speaking, can only be created by an entity holding the private key. Anyone holding the corresponding public key may then be able to use that public key to perform a cryptographic operation and confirm that the piece of data in question was indeed signed by the entity holding the private key. As an example, if an vehicle manufacturer wanted to sign a firmware file such that any vehicle may verify that the firmware came from the vehicle manufacturer, the vehicle manufacturer may: 1) Create the file containing the firmware; 2) Compute a hash function over the firmware; 3) Use the vehicle manufacturer private key to encrypt the hash result, thus creating a digital signature; 4) Send the original firmware file and the encrypted hash result together to any device which is to use the firmware.

The receiving entity, which has obtained the vehicle manufacturer public key through a trusted channel (e.g., loaded into the vehicle at the time of manufacture), may: 1) Compute the hash function over the firmware; 2) Use the vehicle manufacturer public key to decrypt the encrypted hash result distributed with the firmware file; 3) Compare the locally computed hash result to the result of the decrypted hash from step 2.

If the decrypted hash and locally computed hash match, then the vehicle may know that the firmware came from the vehicle manufacturer. If the decrypted hash does not match the locally computed hash, then the vehicle may reject the firmware file. In the context of the security solution being described here, the "firmware file" may be security policy data which the security module will apply to messages from the device connected to the vehicle access port.

A second function of the public key cryptography may be to perform a key exchange between the security module and the device connected to the vehicle access port. A purpose of the key exchange may be to authenticate the accessing entity to the security module and establish a secure session for exchanging data between them. A similar type of key exchange may be performed when one's web browser connects to his or her bank website. The public and private keys contained within the accessing entity may be used as in the following.

The accessing entity (e.g., a diagnostic tool) may pass its public key to the security module. This exchange may use an X.509 certificate structure. This structure may provide fields which can be used to carry data identifying the accessing entity type (e.g., Acme Tool Company, OBD scanner, model 100). The X.509 certificate, when combined with a successful key exchange, may prove to a vehicle that the vehicle is connected to a device certified by the vehicle manufacturer. It may authenticate the identity of the accessing entity. It may bind the accessing entity to the access rights assigned by the vehicle manufacturer. The key exchange (a.k.a., key agreement) may be illustrated in FIG. 3. The key exchange may be performed as indicated in the following paragraphs.

Figure 3:
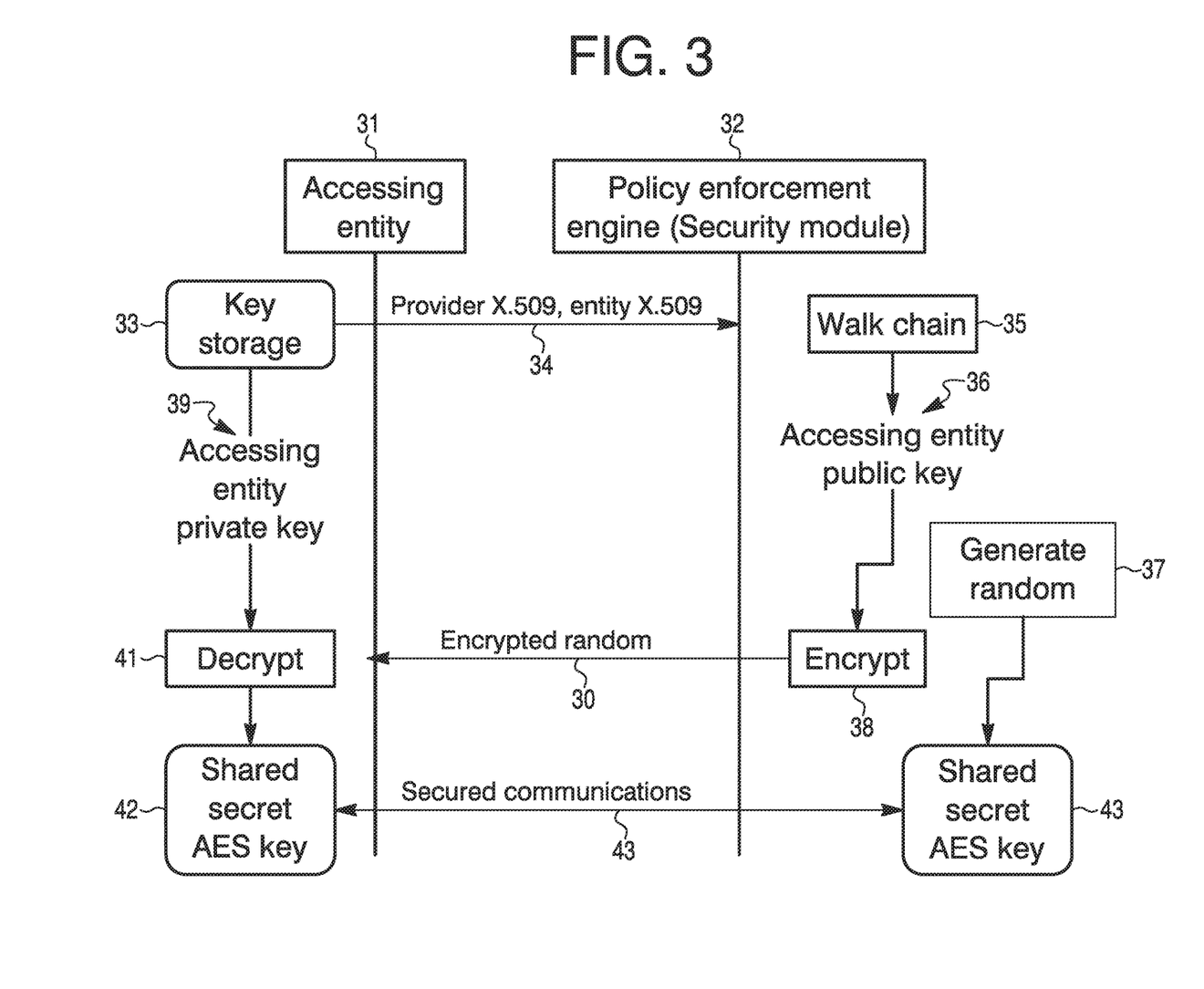
FIG. 3 is a diagram of a key exchange between the accessing entity and the security module or policy enforcement engine.

1) The accessing entity may send the security module within the vehicle the accessing entity X.509 certificate and the X.509 certificate for the device manufacturer. The device manufacturer X.509 certificate may be signed by the vehicle manufacturer using the vehicle manufacturer private key. A certification process is noted herein.

2) The security module or policy enforcement engine may verify the digital signature on the X.509 certificate confirming that it was issued (perhaps indirectly) by the vehicle manufacturer. The security module may "walk the certificate chain" to establish trust. First, the security module may use the vehicle manufacturer public key (embedded in the security module when the vehicle was manufactured) to verify the digital signature on the manufacturer's X.509 certificate. The security module may then extract the manufacturer public key from the freshly verified certificate. The security module may repeat the certificate verification process, this time using the device manufacture's public key to verify the certificate bound to the accessing entity. The vehicle security module may then extract the accessing entity public key from the freshly verified accessing entity X.509 certificate.

3) The security module may generate a random number which will be used as a key for a symmetric cryptographic algorithm (e.g., Advanced Encryption Standard (AES)). The security module may protect the confidentiality of this random number.

4) The security module may use the public key of the accessing entity to encrypt the random number. Public key cryptography may ensure that only the accessing entity holding the private key corresponding to the public key extracted from the X.509 certificate can decrypt the message and recover the original random number. The message containing the encrypted random number may then be sent across the vehicle access port to the accessing entity.

5) The accessing entity may use its private key to decrypt the random number and recover the original plain text version of the random number. Now the security module and the accessing entity both may have the shared secret random number. No other entity necessarily has this number because only the accessing entity with the correct private key may perform the decryption.

6) The security module and accessing entity may use the shared secret in a key derivation process to create a shared symmetric key which will be used to encrypt and authenticate messages sent across the vehicle access port. Successful authentication of the accessing entity may allow the security module to apply the access control specified by the vehicle manufacturer. The cryptographic operations between the accessing entity and policy enforcement engine may be enabled by the system which provides certification and issues the token identifying access rights. FIG. 3 is a diagram of a key exchange between the accessing entity and the security module.

Role-based access control may be noted. The security module may be responsible for enforcing an access control policy on traffic flowing through the vehicle access port. The policy may restrict the type of messages (if any) that the accessing entity is authorized to send into the vehicle. The policy may also restrict vehicle bus messages which are allowed to flow from the vehicle to the accessing entity.

A vehicle may have 50 to 100 ECUs capable of sending thousands of types of vehicle bus messages. The vehicle manufacturer may create an access control policy for each accessing entity by stepping through the entire list of messages and selecting the access rights for each message type individually.

Various terms may indicate capabilities of a device. "Null" means that a device is not able to read or write the message type. "Read only" means that the device is able to read (listen for) the message type but not write the message type. "Write" means that the device is allowed to write messages into the vehicle. "Writes" may be restricted to a white list specifying a list of arbitration IDs and associated message content. For example, in a case of ISO 15765 diagnostic messages, the white list of allowed service identifiers (SIDs) and parameter identifiers (PIDs) may need to be specified in the access control list.

The specification of the access policy may become a burdensome task when it is repeated for each make, model and year for each accessing entity type manufactured by an accessing entity vendor. Role based access control (RBAC) may allow the vehicle manufacturer to create a structured model for assigning access rights. This technique may be applied to industrial control systems controlling plants with thousands of control points. A similar model may be used to allow vehicle manufacturers to efficiently assign access rights to an accessing entity based upon the role associated with the device (e.g., insurance tracking vs. a diagnostic tool).

System level entities may be noted. The entities within the present system may include a security module, vehicle manufacturers, accessing entity manufacturers, an accessing entity and certificate, and a policy change authorization token. The security module 14 may sit between the vehicle access port 11 and the vehicle bus 21, 22, as shown in FIG. 1, and may enforce security. It may be embedded into the vehicle access port; it may be an inline module between the access port and vehicle bus; or it may be implemented within a gateway device if the vehicle uses a gateway to bridge vehicle busses. The security module may authenticate the OBD connected device and then apply the corresponding security policy as specified by the vehicle manufacturer.

The vehicle manufacturer may be responsible for establishing policies to be enforced by the security module. A vehicle manufacturer may provide a process by which ODB device manufacturers may request security policies for its devices. The vehicle manufacturer may also serve as the public key certification authority (CA) for the vehicles that it manufactures. The vehicle manufacturer may hold the private key and load the corresponding public key into each security module. The vehicle manufacturer may use its private key to digitally sign certificates for accessing entity manufacturers.

Accessing entity manufacturers may receive an X.509 certificate from the vehicle manufacturer and act as a certification authority for the devices that they produce. The device manufactures may also produce a private/public key pair for each device manufactured. They may use their private key to sign certificates which are bound to their product. These certificates may contain the public key of the manufactured device as well as the security policy that the vehicle manufacturer approved for the product.

The accessing entity and certificate may be noted. The device which will plug into the vehicle access port may contain a public/private key pair unique to that device. The public key may also be contained in the device certificate signed by the device manufacturer. The device may use a trusted storage (e.g., a secure microcontroller) to protect its private key.

A policy change authorization token may be noted. The vehicle manufacturer may create a token and digitally sign it. This token may flow from the vehicle manufacturer to the accessing entity manufacturer, into an accessing entity and finally into the security module. The security module may be able to verify the digital signature applied by the vehicle manufacturer. The above noted five entities may work together during the certification process and operation as noted herein.

As to the certification process, the vehicle manufacturer may control the certification process for accessing entities which will interact with the vehicle manufacturer's vehicles. There may be an approach that the vehicle manufacturer uses to certify a manufacturer and its devices. It may include a statement by the manufacturer regarding the access rights that their device needs in order to perform its intended function. The vehicle manufacturer may perform a risk assessment which takes into account the level of confidence placed in the accessing entity and a potential for introducing a security or safety risk to the vehicle. At the end of the risk analysis, the vehicle manufacturer and the accessing entity manufacturer may agree upon the security policy that the vehicle will apply to the device. The following may describe the process for binding the vehicle manufacturer specified security policy to the accessing entity.

The accessing entity and associated authorization token may be verified by the vehicle without the need for the vehicle or accessing entity to connect to a network. The public key material and a corresponding public key infrastructure to allow the vehicle to verify the vehicle manufacturer specified security policy to be applied to an accessing entity may be outlined below and shown in FIG. 4.

First the vehicle manufacturer may create a public/private key pair. The private key may be protected in a hardware security module and backed up by the vehicle manufacturer. Second, the accessing entity manufacturer may create a public/private key pair and send the public key to the vehicle manufacturer along with the manufacturer identification data using a certificate signing request protocol (e.g., Certificate Management Protocol (CMP), Simple Certification Enrollment Protocol (SCEP)). Third, the vehicle manufacturer may use the vehicle manufacturer certification authority private key to digitally sign a certificate (e.g. X.509v3) containing the accessing entity manufacturer identity and public key.

Fourth, the vehicle manufacturer may create a policy change authorization token which includes the changes to the policy and the manufacturer, make and model of the set of devices associated with this authorization token. The authorization token may be signed using the vehicle manufacturer private key and sent to the accessing entity manufacturer.

Fifth, a public/private key pair may be created for the accessing entity. If the accessing entity is a device, then the public key pair may be typically created during device manufacturing. If the accessing entity is software, the public key pair may be (other approaches may be possible) created when the software is installed.

Sixth, the accessing entity manufacturer or provider may use the accessing entity manufacturer private key to sign a certificate for the accessing entity containing the device identification data (e.g., manufacturer, make and model) and the accessing entity public key. The accessing entity manufacturer may also load a copy of the accessing entity manufacturer certificate into the accessing entity.

At the end of the present process above, the accessing entity may contain an accessing entity provider or manufacturer certificate signed by the vehicle manufacturer, an accessing entity certificate signed by the accessing entity provider or manufacturer, and a policy change authorization token specific to the accessing entity type (manufacturer, model or provider and software) signed by the vehicle manufacturer. During the vehicle manufacturing process, the vehicle manufacturer may load the vehicle manufacturer public key into the security module or policy enforcement engine.

Figure 4:
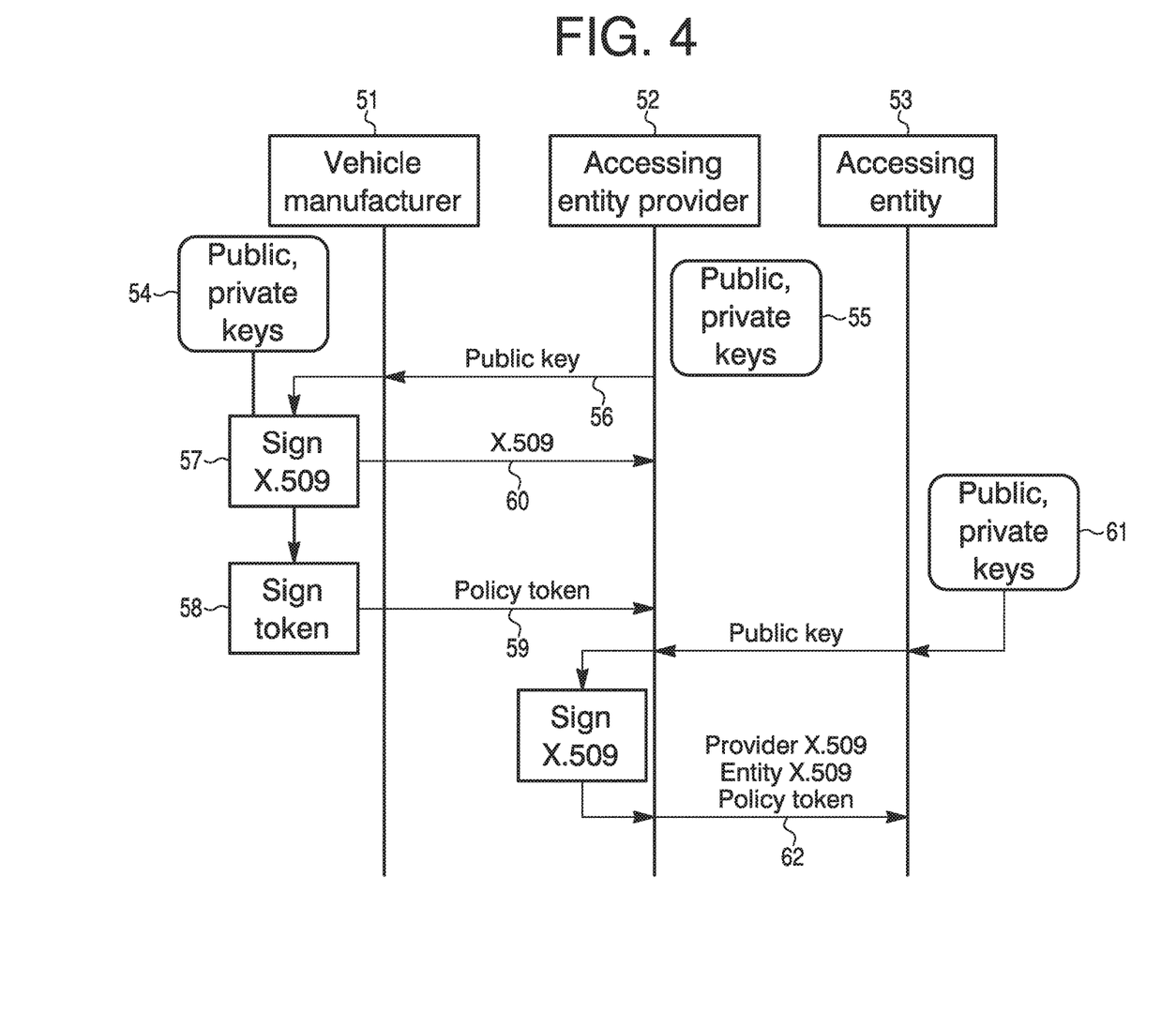
FIG. 4 is a diagram about creation of accessing entity credentials.

FIG. 4 is a diagram of a creation of the noted accessing entity credentials.

Sample policies noted below may illustrate an application of security policy within the security module to enhance vehicle security and safety. As to safety, one may assume that a vehicle bus message ID 5 with content 0000 0000 0000 1111 tells the brake system to vent pressure from the wheel cylinders. This may be done to bleed air out of the hydraulic brake system. The security module default safety policy may block message ID=5, content 0000 0000 0000 1111 from being injected via the vehicle access port. The policy may likely block a broad set of messages. This may prevent a compromised accessing entity (e.g., insurance dongle with a modem), such as an attacker, from disabling the brakes on a vehicle. A tool certified by the vehicle manufacturer to be used by a service technician to bleed the brakes may have an authorization token which turns off this policy, thus allowing the service technician to bleed the brakes. If another accessing entity (e.g., a compromised insurance dongle) was plugged into the vehicle access port after the technician serviced the vehicle, then the safety policy may prevent the second accessing entity from issuing the bleed brakes command to the vehicle. The authorization token may be only in effect while the accessing entity linked to the authorization token is connected to the vehicle access port and is using a randomly generated cryptographic key from the security module or enforcement engine.

As to security, the keyless entry system on a vehicle may be able to send a vehicle bus message to unlock the doors.

However, a compromised accessing entity (e.g., an attacker) could also send an unlock command, allowing a thief into the vehicle. Therefore, a security policy in the vehicle security module may be to block "unlock door" messages sent into the vehicle via other interfaces unless the accessing entity has provided a policy change authorization token signed by the vehicle manufacturer.

The sample policies above may illustrate that the vehicle manufacturer can apply a default policy which protects the vehicle safety but allows legacy devices to still perform their intended function. An accessing entity which can provide the proper authorization token may be able to perform functions which are beyond the default policy.

One may imagine many more threats and policies which would block those threats. In general, the security module policy should be able to block messages from the accessing entity unless the accessing entity has a policy change authorization token opening up the policy.

A few of the many types of policy changes which could be requested for an accessing entity include the items such as allowing the device to limit the speed of a vehicle. This limit may be used in fleet management applications. Other items may include allowing the device to load new firmware on an ECU, allowing the accessing entity to read the GPS coordinates of a vehicle so the accessing entity can provide vehicle tracking, allowing a device to remotely start the engine of a vehicle, and allowing the accessing entity to send a command to change the emissions control setting on a vehicle.

The use of an authorization token may be one way, since other formats or structures may yield similar results.

The vehicle manufacturer may be responsible for the policy specification in the security module or policy performance engine as well as the format used within the policy change authorization token. The authorization token may take many forms depending upon the structure used for specifying policy within the security module. Data fields which would be typical in the authorization token may include applicable vehicles, a policy/rule identifier, an allowable message ID list, and specific message ID/value pairs.

As to applicable vehicles, a device may be allowed to change the policy on vehicles produced since a specific year (e.g., 2017) but not before. The accessing entity may only be licensed with the vehicle manufacturer to be used on certain models and therefore the authorization token may identify the set of licensed vehicles.

As to a policy/rule identifier, depending upon how the vehicle manufacturer manages policy/rules in the security module, the token may specify the number of the rule which is to be modified or turned off, e.g., "turn off rule 3". As to the allowable message ID list, many firewalls, security modules and/or policy enforcement engines may operate using a "deny unless explicitly allowed" model. Thus, if a policy does not explicitly allow a message ID, that message ID may be blocked. An "allowable message ID" field may specify IDs which are allowed to pass across the policy enforcement engine. As to specific message ID/value pairs, frequently there may be multiple parameters within a message. For example, one byte may control the throttle position while another byte in the same message may control an amount of fuel delivered. A default policy may allow a message ID x but only allow a specific set of parameters. For instance, it may only allow a byte specifying an amount of fuel to be between 10 and 100. The policy may allow an authorized accessing entity to change these parameter limits.

Operation of the present system may be noted. A security module or policy enforcement engine may ship with a default security policy. This policy may specify the types of messages allowed to flow to and/or from the vehicle. The policy change authorization token may specify changes to be applied to the policy when the accessing entity associated with the authorization token is communicating with the vehicle.

Up to this point, the focus appears to have been on creating an infrastructure and a process of creating policy. One question is what actually may happen in the field when an accessing entity connects to the vehicle equipped with a security module.

Some cases of interest may be noted below. For instance, one may note a non-certified accessing entity with no extra privilege.

When an accessing entity, which has not been certified by the vehicle manufacturer (e.g., a legacy insurance dongle), connects to a vehicle, the security module or policy enforcement engine may attempt to authenticate the device and obtain the policy change authorization token. Obviously, a legacy accessing entity will not necessarily complete the authentication. The security module may simply enforce a default policy established by the vehicle manufacturer.

The default policy may allow an accessing entity to observe all of the vehicle bus traffic but not necessarily allow the accessing entity to inject any messages into the vehicle. A policy may be to allow a set of diagnostic service identifiers (SIDs) needed for emissions compliance testing that are known to be benign. Allowing diagnostics SIDs do not necessarily put the vehicle in danger since they only read information and do not necessarily modify anything. A default policy may also allow reading diagnostic trouble codes (DTCs) and clearing them. Such semi-open default policy may still secure while preserving all legitimate legacy use cases.

An accessing entity certified with privilege may be noted. When a certified accessing entity connects to a vehicle, the security module and accessing entity may perform the protocol exchange described above relative to the public key and a diagram of FIG. 3. This protocol exchange and cryptographic processing within the security module may accomplish allowing the security module to confirm the identity of the accessing entity connected to the vehicle access port, allowing the security module to confirm that the policy change authorization token is bound to the accessing entity, allowing the security module to confirm that the policy change authorization token was authorized by the vehicle manufacturer, and allowing the security module and accessing entity to establish a cryptographically protected communications channel.

The accessing entity may be able to perform all of the functions it has been certified for. There may necessarily be no need for additional manual operations by the vehicle owner or technician to enable the vehicle manufacturer approved security policy modification.

The operations described above may support a notion of securely distributing the new policy and using this policy as an alternative to the one-size-fits-all model. There are variations of the approach described above which may apply the same principles to provide a policy tailored to a specific accessing entity.

Technology options may be available for providing the present system and approach. A vehicle manufacturer and its tool partners may select specific technologies and processes suitable for their businesses. Variations in the process described herein that produce a similar result may incorporate the following items. As to a cryptographic algorithm, it may be a public key algorithm that could be an RSA or elliptic curve. As to a cryptographic key length, various public key pairs (e.g., vehicle manufacturer, accessing entity, and provider) may use different key lengths appropriate to the perceived threat. As to a certificate structure, the certificates may be X.509 v3 certificates, or a proprietary format. However, there may be a large base of mature software available for X.509 certificates or other structures. A public key infrastructure (PKI) may be a simple structure in which the vehicle manufacturer serves as its own root of trust (a.k.a., root certificate authority). The system may use a larger and more complete PKI in which the root of trust is above the vehicle manufacturer. This type of structure may allow one accessing entity to be recognized by security modules or policy enforcement engines associated with multiple vehicle manufacturers.

As to a key exchange protocol, many different protocols may exist to establish the secure communications between the security module or policy enforcement engine and the accessing entity. A transport layer security (TLS) protocol may provide an example which has been reviewed by a security community.

As for policy change authorization token distribution, an authorization token may be distributed by embedding it within the accessing entity such that the accessing entity is the transport mechanism. The authorization token may be embedded in the security module or policy enforcement engine and activated when an authorized accessing entity authenticates itself. The authorization token may be fetched in real time by either the vehicle policy enforcement engine (or security module) or the accessing entity. An aspect is that the vehicle may obtain an authorization policy specific to an entity requesting access.

As for an authorization token structure, the structure of the policy override may be a complete replacement of the default security module or policy enforcement engine policy. Alternatively, the structure may simply identify changes to the default policy.

The present system and approach may provide vehicle manufacturers with the flexibility to change the security and/or safety policy of the security module in the field using a cryptographically protected authorization token which is cryptographically bound to an OBD connected device. The same policy change concept may be applied to devices or services accessing the vehicle via any of the telematics control unit (TCU) interfaces (e.g., cellular, Wi-Fi, Bluetooth or USB). The device or service attempting to access the vehicle may be required to perform a cryptographic handshake with an access control function within the vehicle. The device or service requesting access may pass its X.509 certificate containing identification data along with policy change authorization data to the access control function within the vehicle. The vehicle may then enforce access rights established by the vehicle manufacturer specifically for the device or service requesting access. There may be a need to protect a vehicle from unauthorized message injection via the vehicle access port.

FIG. 1 is a diagram of an on-board computer arrangement 12 of a vehicle. The diagram may indicate placement of a security module within a vehicle. A vehicle access port or interface 11 may provide for an input for control or diagnostics. Port 11 may also be an output for signals such as those containing information and data. There may be an accessing entity 13, such as electronic instrumentation, seeking connection to vehicle access port 11. Port 11 may be connected to a policy enforcement engine or security module 14. Accessing entity 13 may provide an input for control or programming of electronic control units (ECUs) 15 and 16 on a high-speed vehicle bus 21, and ECUs 17 and 18 on a medium speed vehicle bus 22. Security module or policy enforcement engine 14 may restrict access to ECUs' inputs and outputs. Module or engine 14 may incorporate a gateway integrated in its electronics. What is permitted in terms of inputs and outputs to and from buses 21 and 22, and respective ECUs 15-18, may be based on policy as emanated by policy enforcement engine or security module 14.

FIG. 3 is a diagram of a key exchange between an accessing entity 31 and a security module 32. Accessing entity 31 may, from its key storage 33, send a device manufacturer X.509 certificate and an accessing entity X.509 certificate to security module 32 along a line 34 to a walk chain 35. Security module 32 may verify a digital signature on the X.509 certificate to confirm that it was issued by a vehicle manufacturer. Security module 32 may walk the chain 35 to establish trust. Walk chain 35 may use a vehicle manufacturer public key 36 to verify the digital signature on the manufacturer X.509 certificate. Security module 32 may generate a random number at step 37. The random number may be used as a key for a symmetric cryptographic algorithm (e.g., AES).

Security module 32 may use the public key 36 of the accessing entity to encrypt the random number at symbol 38. Public key cryptography may ensure that only the accessing entity holding the private key, at symbol 39 from device storage 33 corresponding to the public key extracted from the X.509 certificate can decrypt the message at symbol 41 and recover the original random number.

A message containing the encrypted random number may be sent across the vehicle access port from security module 32 to accessing entity 31. Accessing entity 31 may use its private key to decrypt the random number at symbol 41 and recover the original plain text version of the random number. Now both security module 32 and accessing entity 31 may have a shared secret random number. It may be said that no other entity has this random number because only an accessing entity with the correct private key can perform the decryption. Security module 32 and accessing entity 31 may use a shared secret in a key derivation process to create the shared symmetric key which can be used to encrypt and authenticate messages sent across the vehicle access port as indicted by shared secret AES key 42 of accessing entity 31, secured communications along line 43, and shared secret AES key of security module 32.

At line 34, accessing entity 31 may provide its certificate chain to a vehicle. At symbol 35, the vehicle may walk the chain to a root of trust. At symbol 37, the vehicle may generate a random pairwise key to be used for continuous authentication. At line 30, the random pairwise key may be encrypted using the accessing entity public key. At symbol 41, the accessing entity may decrypt the key packet using its private key. At line 43, the key may be used to secure communications.

FIG. 4 is a diagram of creation of accessing entity credentials. The diagram shows public key material and a corresponding public key infrastructure to allow a vehicle to verify a vehicle manufacturer security policy to be applied to an accessing entity 53. A vehicle manufacturer 51 may create a public/private key pair at symbol 54. The private key may be protected in a hardware security module and backed up by vehicle manufacturer 51. An accessing entity manufacturer or provider 52 may create a public/private key pair at symbol 55 and send the public key to vehicle manufacturer 51 on line 56, along with manufacturer identification data using a certificate signing request protocol (e.g., certificate management protocol (CMP)). Vehicle manufacturer 51 may use a vehicle manufacturer certification authority private key to digitally sign a certificate (e.g., X.509) at symbol 57, containing an accessing entity manufacturer or provider 52 identity and public Key.

Vehicle manufacturer 51 may create a policy change authorization token which includes changes to the policy and the manufacturer, make and model of the set of devices associated with the authorization token. The authorization token may be signed at symbol 58, using the vehicle manufacturer private key, and may be sent to accessing entity manufacturer or provider 52 along line 59.

A public/private key pair may be created to by accessing entity 53 at symbol 61. accessing entity manufacturer 52 may use the accessing entity manufacture 52 private key to sign a certificate for accessing entity 53 containing the device identification data (i.e., manufacturer, make and model) and the device public key. Accessing entity manufacturer or provider 52 may also load a copy of the accessing entity certificate into accessing entity 53 at line 62.

At line 60, vehicle manufacturer 51 may create and sign a one-time certificate for accessing entity provider 52. At line 59, vehicle manufacturer 51 may create a one-time policy token for an accessing entity 53 type. At line 62, accessing entity provider 52 may sign the certificate for each specific accessing entity 53.

Figure 5:
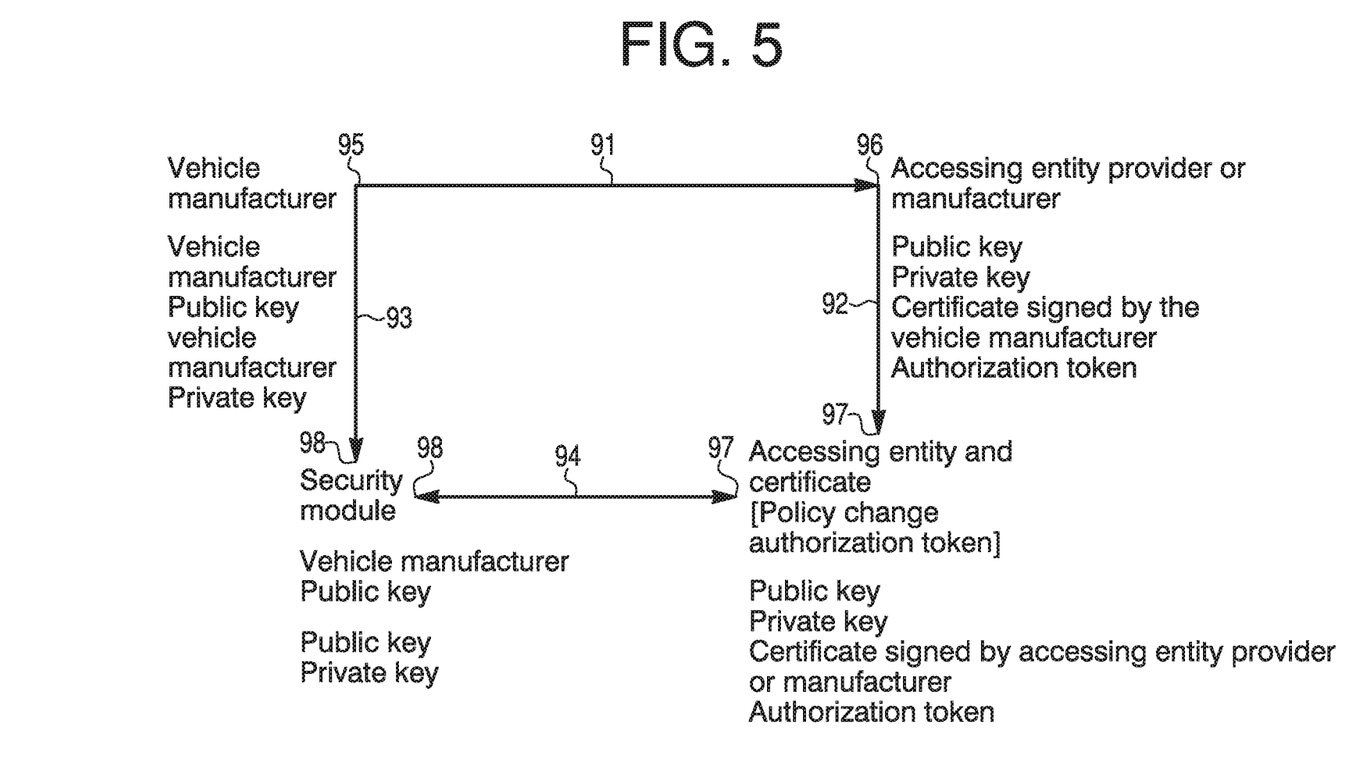
FIG. 5 is a diagram of entity relationships.

FIG. 5 is a diagram of entity relationships. Along arrow 91, an accessing entity provider or manufacturer may request a product certification. Along arrow 92, the accessing entity provider or manufacturer may build an accessing entity. Along arrow 93, the vehicle manufacturer may build a vehicle. Along arrow 94, the accessing entity may be connected to the vehicle.

In the diagram of FIG. 5, at location 95, may be may be the vehicle manufacturer with a vehicle manufacturer public key and a vehicle manufacturer private key. At location 96 may be the accessing entity provider or manufacturer with a public key, a private key, a certificate signed by the vehicle manufacturer, and an authorization token. At location 97 may be an accessing entity and certificate (policy change authorization token) with the public key, the private key, a certificate signed by the accessing entity provider or manufacturer, and an authorization token. At location 98 may be a security module or policy enforcement engine with the manufacturer public key, the public key and the private key.

To recap, a system having a secured access may incorporate one or more vehicle buses, one or more electronic control units (ECUs) on a vehicle connected to the one or more vehicle buses, a security module connected to the one or more vehicle buses, a vehicle access port connected to the security module, and an accessing entity connected to the vehicle access port. Vehicle bus messages injected or extracted by the accessing entity may be authorized at the security module based on a security policy before going to or from the one or more vehicle buses, or blocked if unauthorized.

The security policy may incorporate a default policy.

The accessing entity may be one or more items selected from a group incorporating an insurance dongle, a diagnostic tool, an emissions compliance tester, trouble code reader and clearer, calibration and tuning tool, mobile computing device (e.g., cell phone, laptop, tablet), another vehicle (V2V), infrastructure (V2I), and a telematics system.

OnStar™ may be an example of a telematics system. Other telematics systems from other auto makers may include uConnect™ (Fiat Chrysler Automobiles), SYNC Connect™ (Ford) and ConnectedDrive™ (BMW).

A goal may be to identify the telematics system or application provided by the auto maker as one of the accessing entities that can communicate with the vehicle.

A key exchange may be performed between the security module and an accessing entity connected to the vehicle access port, to authenticate the accessing entity to the security module and establish a secure communications channel between the security module and the accessing entity.

The key exchange may incorporate a vehicle manufacturer of the vehicle having the one or more ECUs, that signs the accessing entity provider certificate with a vehicle manufacturer private key. The accessing entity may send an accessing entity certificate and an accessing entity provider certificate to the security module. The security module may verify the accessing entity provider certificate as being signed by the vehicle manufacturer by using a vehicle manufacturer public key embedded in the security module when the vehicle was manufactured. The security module may again verify the accessing entity certificate by using an accessing entity provider public key. The security module may extract an accessing entity public key from the accessing entity certificate. The security module may generate a random code that is kept confidential by the security module. The security module may use the accessing entity public key to encrypt the random code so that only the accessing entity holding an accessing entity private key corresponding to the accessing entity public key can decrypt and recover the random code. The encrypted random code may be sent via the vehicle access port by the security module to the accessing entity. The accessing entity may decrypt the random code with the accessing entity private key.

The security module and the accessing entity may use the random code to create a shared symmetric key to encrypt and authenticate messages through the vehicle access port.

Authentication of the accessing entity may allow the security module to apply an access control policy specified by the vehicle manufacturer.

Access control policy may provide the security module authority to restrict vehicle bus messages from the accessing entity to the vehicle and from the vehicle to the accessing entity.

The system may further incorporate a gateway situated between the vehicle access port and the one or more vehicle buses. The gateway may implement the security module.

The certificates may be selected from a group incorporating X.509 certificates, IEEE 1609.2 forms and proprietary formats.

A mechanism for controlling signals between a vehicle and an entity outside of the vehicle, may incorporate a vehicle having one or more electronic control units (ECUs), a vehicle bus connected to the one or more ECUs, a security module connected to the vehicle bus, and a vehicle access port connected to the security module. The security module may pass, control, restrict and/or block signals between the vehicle access port and the vehicle bus according to a policy.

The vehicle may be a product of a vehicle manufacturer. The vehicle manufacturer may specify a security policy to be applied to an accessing entity having a wireless or non-wireless connection with the vehicle access port.

The vehicle manufacturer may create a vehicle manufacturer public key and a vehicle manufacturer private key. The vehicle manufacturer private key may be protected in a vehicle manufacturer security module. An accessing entity provider may create an accessing entity provider public key and an accessing entity provider private key. The accessing entity provider may send the accessing entity provider public key and accessing entity provider information using a certificate request protocol. The vehicle manufacturer may use the vehicle manufacturer private key to sign the accessing entity provider certificate. The vehicle manufacturer may create a policy change authorization token having changes to the security policy. The vehicle manufacturer may sign the policy change authorization token with the vehicle manufacturer private key. The vehicle manufacturer may send the policy change authorization token to the accessing entity provider. An accessing entity public key and an accessing entity private key may be created for the accessing entity. The accessing entity provider may use the accessing entity provider private key to sign an accessing entity certificate, containing accessing entity information, for the accessing entity. The accessing entity provider may load a copy of the accessing entity provider certificate into the accessing entity.

The accessing entity may contain the accessing entity provider certificate signed by the vehicle manufacturer, the accessing entity certificate signed by the accessing entity provider, and the policy change authorization token specific to the accessing entity.

The vehicle manufacturer may load the vehicle manufacturer public key into the security module, during a manufacturing process of the vehicle.

The security module may be made with a default security policy which is changeable by the policy change authorization token.

An approach of controlling signals to and from a vehicle, may incorporate connecting a security module to a vehicle access port, and connecting an electronic control network of a vehicle to the security module. The security module may accept or reject signals destined to or from the electronic control network, according to a security policy. The signals may be from or to an accessing entity that has a wireless or non-wireless connection to the vehicle access port.

A vehicle manufacturer of the vehicle may consider one or more security policies from an accessing entity provider, for the accessing entity. A security policy may be selected from the one or more security policies by the vehicle manufacturer to the accessing entity provider for the accessing entity.

The security module may assign specific access rights to an accessing entity based on a role associated with the accessing entity.

The accessing entity may incorporate a telematics control unity (TCU) interface.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A mechanism for controlling signals between a vehicle and an entity outside of the vehicle, comprising:
   a vehicle having one or more electronic control units (ECUs);
   a vehicle bus connected to the one or more ECUs;
   a security module connected to the vehicle bus; and
   a vehicle access port connected to the security module; and
   wherein:
      the security module passes, controls, restricts or blocks signals between the vehicle access port and the vehicle bus according to a vehicle manufacturer security policy;
      the vehicle is a product of a vehicle manufacturer;
      the vehicle manufacturer security policy applies to an accessing entity having a wireless or non-wireless connection with the vehicle access port;
      the vehicle manufacturer creates a vehicle manufacturer public key and a vehicle manufacturer private key;
      the vehicle manufacturer private key is protected in the security module;
      an accessing entity provider creates an accessing entity provider public key and an accessing entity provider private key;
      the accessing entity provider sends the accessing entity provider public key and an accessing entity provider identification data to the vehicle manufacturer using a certificate request protocol;
      the vehicle manufacturer uses the vehicle manufacturer private key to sign an accessing entity provider certificate, wherein the accessing entity provider certificate includes the accessing entity provider identification data and the accessing entity provider public key;
      the vehicle manufacturer creates a policy change authorization token having changes to the vehicle manufacturer security policy;
      the vehicle manufacturer signs the policy change authorization token with the vehicle manufacturer private key;
      the vehicle manufacturer sends the policy change authorization token to the accessing entity provider;
      an accessing entity public key and an accessing entity private key are created by the accessing entity provider for the accessing entity;
      the accessing entity provider uses the accessing entity provider private key to sign an accessing entity certificate containing the accessing entity identification data and the accessing entity public key; and
      the accessing entity provider loads a copy of the accessing entity provider certificate, the accessing entity certificate, and the policy change authorization token into the accessing entity.

2. The mechanism of claim 1, wherein the accessing entity contains the accessing entity provider certificate signed by the vehicle manufacturer, the accessing entity certificate signed by the accessing entity provider, and the policy change authorization token specific to the accessing entity.

3. The mechanism of claim 1, wherein the vehicle manufacturer loads the vehicle manufacturer public key into the security module, during a manufacturing process of the vehicle.

4. The mechanism of claim 1, wherein the security module is made with a default security policy which is changeable by the policy change authorization token.

* * * * *